(No Model.)
J. J. BETTINGER.
WIRE STRIPPER.
No. 520,818. Patented June 5, 1894.
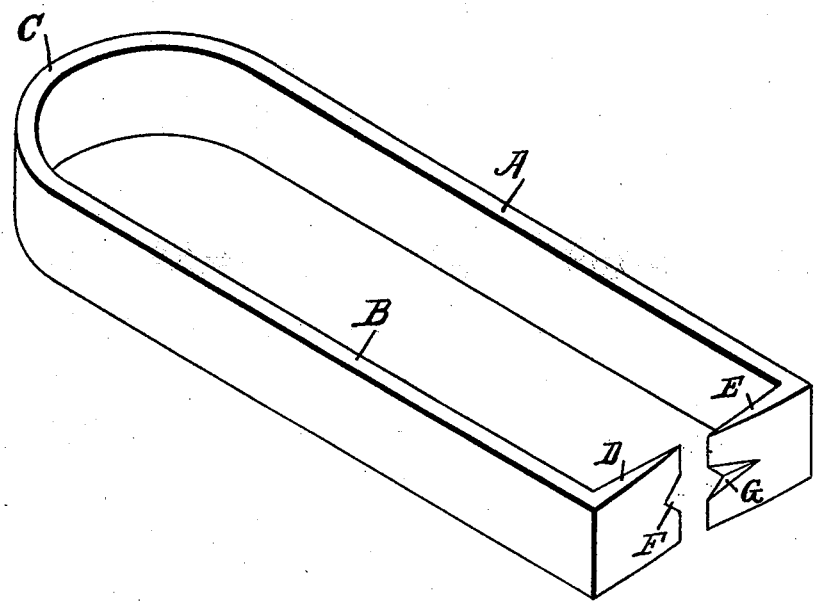
Witnesses:
M. S. Bolden
C. M. Sheehan
John J. Bettinger
Inventor
by James W. See
Attorney

UNITED STATES PATENT OFFICE.

JOHN J. BETTINGER, OF HAMILTON, OHIO, ASSIGNOR TO CHARLES L. CORNELL, OF SAME PLACE.

WIRE-STRIPPER.

SPECIFICATION forming part of Letters Patent No. 520,818, dated June 5, 1894.

Application filed January 16, 1894. Serial No. 497,091. (No model.)

*To all whom it may concern:*

Be it known that I, JOHN J. BETTINGER, of Hamilton, Butler county, Ohio, have invented certain new and useful Improvements in Wire-Strippers, of which the following is a specification.

This invention pertains to an implement to be used by electric linemen in stripping the fibrous covering from insulated wires.

My invention will be readily understood from the following description, taken in connection with the accompanying drawing, which is a perspective view of my improved wire stripper.

Referring to the drawing:—A and B indicate a pair of metallic handles of sufficient length to be firmly grasped in the hand; C, a spring bow uniting one end of the handles and tending to hold them a normal distance apart and permitting them to be squeezed closer together; D, a blade projecting inwardly at right angles from the end of handle B; E, a similar blade projecting inwardly from handle A, the ends of these blades standing normally apart from each other and being capable of over-lapping in contact when the two handles are pressed toward each other; F, a triangular notch in the end of blade D, this notch having straight walls which are brought to a knife edge and hardened; G, a similar notch in the end of blade E.

To use the implement the wire is inserted between the open blades which are then forcibly compressed upon the wire and given a twisting motion which causes the sharp straight sides of the notches to cut shear-like through the insulation down to the wire. The implement is then, while still firmly squeezed upon the wire, given an endwise pull, thus stripping the fibrous covering from the wire. The implement may then be used in a similar and obvious manner for scraping the exposed end of the wire bright.

I claim as my invention—

The improved wire stripper composed of a pair of handles joined by a spring bow and armed with blades projecting inwardly at right angles to the handles and adapted to overlap in shear-like contact and provided in the ends of the blades with triangular notches having their sides straight and formed with knife edges.

JOHN J. BETTINGER.

Witnesses:
  SAM D. FITTON, Jr.,
  J. W. SEE.